Feb. 5, 1924.  1,482,886

M. S. COLT

HOLDER FOR CLEANING DEVICES

Filed July 1, 1922

WITNESS:
*Rob R Kitchel.*

INVENTOR
*Martha S. Colt*
BY
*Frank S Busser*
ATTORNEY

Patented Feb. 5, 1924.

1,482,886

UNITED STATES PATENT OFFICE.

MARTHA S. COLT, OF MOUNT WOLF, PENNSYLVANIA.

HOLDER FOR CLEANING DEVICES.

Application filed July 1, 1922. Serial No. 572,176.

*To all whom it may concern:*

Be it known that I, MARTHA S. COLT, a citizen of the United States, residing at Mount Wolf, county of York, and State of Pennsylvania, have invented a new and useful Improvement in Holders for Cleaning Devices, of which the following is a full, clear, and exact description, reference being had to the accompanying drawings, which form a part of this specification.

My invention relates to handles or holding means for fibrous or other soft, flexible material and for rubbing, polishing or scouring.

The object of my invention is to provide a handle adapted to receive and hold such material so that it may be used in the rubbing action by being grasped conveniently in the hand, and at the end thereof the rubbing material may be removed and fresh material inserted in its place.

My invention is of rounded, handle-like form, split longitudinally into two halves which are spring-held together. One end of the handle forms jaws which are operable for the insertion and removal of the rubbing or scouring material. It has the advantage of being a small, inexpensive culinary article, which may be used over and over again for an indefinite period. The material which it holds may be a fibrous, spongy mass, used in scouring pots and pans, and with my invention it can be readily removed to be thoroughly cleansed or thrown away, or after using the material for a time, the handle may be removed and caused to grip it on the used part of the material, exposing the fresh, previously-gripped portion to do the work. The handle itself is a sanitary article, inasmuch as it is of simple solid form and can be readily cleansed.

My invention provides a simple means of removably holding a scouring medium, which will be a boon to all housewives, as it will save their hands from the dirt and grease, and likewise may be used for holding any form of soft material for cleaning and polishing.

I will now describe an embodiment of my invention in connection with the accompanying drawing, in which.

Figure 3:
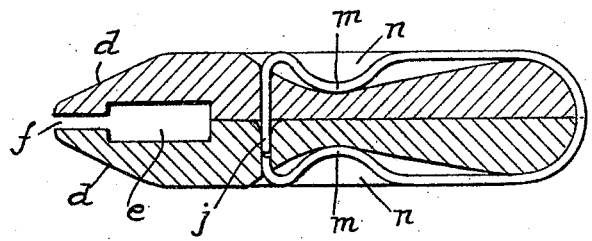
Fig. 3 is a similar view of a modified form of handle.
Figure 4:
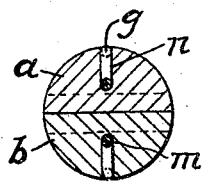
Fig. 4 is a cross-section on line 4—4 of Fig. 3.

The handle is of general cylindrical shape, split lengthwise into two halves $a$ and $b$. The handle is rounded at one end as at $c$, and at the other end the two halves are beveled off as at $d$, $d$, and have a slotted opening $e$ between them to form jaws. As shown in Fig. 3, the jaws may be slotted out slightly, from the opening $e$ to the end, leaving a narrow opening $f$.

The two halves of the handle are held together by a spring $g$, fixedly inserted at one end $h$ in one of the halves $b$, passing longitudinally back and around the rounded end $c$ of the handle and forward again on the other half $a$, where it is bent at right angles and passes through a radial hole $i$ in half $a$.

Figure 2:
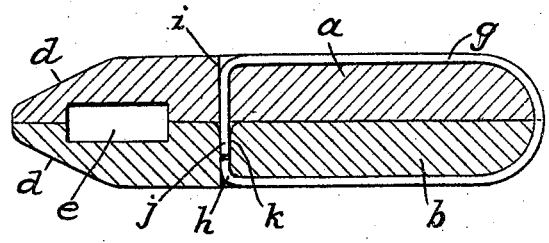
Fig. 2 is a longitudinal section through the handle shown in Fig. 1.

The spring is inset in a groove in parts $a$ and $b$ so that at no point does it protrude outside of the cylindrical or rounded surface. Its free end $j$ projects beyond the end of hole $i$ in part $a$ and there is a hole or socket $k$ provided in part $b$, aligning with hole $i$, for the reception of this projection. The spring may follow the contour of the handle as shown in Figure 2, or it may be bent inwardly as at $m$, $m$, in Figure 3, slots $n$ being provided in both parts of the handle in such a manner that the spring pressure is delivered at the bottom of the slots by the bends $m$, $m$. The projection $j$ in the socket $k$ keeps the two halves of the handle in alignment.

Figure 1:
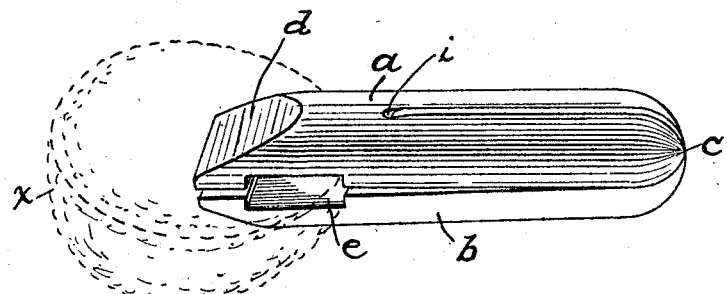
Fig. 1 is a perspective view of my handle with a bunch of soft material indicated in dotted lines.

The jaws may be slightly sprung apart by the fingers and a bunch of soft material $x$ inserted, when it will be gripped by the released jaws as in Figure 1.

Having now fully described my invention, what I claim and desire to protect by Letters Patent is:

1. A holding device comprising a handle formed of two substantially similar pieces, a spring extending around said pieces at one end and longitudinally of the body thereof, one end of said spring being anchored in each of said pieces at points spaced from the ends thereof, and means to maintain said spring in position relative to said pieces.

2. A holding device comprising a handle formed of two substantially similar pieces, each of said pieces being provided with grooves extending longitudinally of the body and transversely of one of the ends thereof, and a spring extending around the ends of said pieces and longitudinally of the body thereof and lying in said grooves, one end of said spring being anchored in each of said pieces at points spaced from the ends theerof.

3. A holding device comprising a handle formed of two substantially similar pieces, each of said faces being oppositely recessed adjacent one end to form jaws, each of said pieces being provided with a groove extending longitudinally of the body and transversely of the end thereof opposite said jaw-forming recesses, and a spring extending around the ends of said pieces and longitudinally of the body thereof and lying in said grooves, one end of said spring being anchored in each of said pieces at points spaced from the ends thereof.

In testimony of which invention, I have hereunto set my hand, at Harrisburg, Pa., on this 29th day of June, 1922.

MARTHA S. COLT.